(12) United States Patent
Kurita et al.

(10) Patent No.: US 7,457,073 B2
(45) Date of Patent: Nov. 25, 2008

(54) DISK DRIVE THAT CONTROLS HEATER CURRENT ACCORDING TO ROTATIONAL SPEED

(75) Inventors: Masayuki Kurita, Tokyo (JP); Yukie Hiratsuka, Tokyo (JP); Mikio Tokuyama, Tokyo (JP); Hideaki Tanaka, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 100 days.

(21) Appl. No.: 11/706,934

(22) Filed: Feb. 14, 2007

(65) Prior Publication Data

US 2007/0188908 A1    Aug. 16, 2007

(30) Foreign Application Priority Data

Feb. 16, 2006    (JP)    ............................. 2006-039165

(51) Int. Cl.
*G11B 5/60*    (2006.01)
*G11B 21/21*    (2006.01)

(52) U.S. Cl. ..................................... 360/75; 360/73.03

(58) Field of Classification Search ........................ None
See application file for complete search history.

(56) References Cited

U.S. PATENT DOCUMENTS

| | | | |
|---|---|---|---|
| 6,067,203 A * | 5/2000 | Ottesen et al. ................. 360/75 |
| 6,483,657 B1 * | 11/2002 | Fioravanti et al. ............. 360/75 |
| 6,788,488 B2 * | 9/2004 | Antonio et al. ........... 360/73.03 |
| 6,972,919 B2 * | 12/2005 | Suk ............................... 360/75 |
| 7,130,141 B2 * | 10/2006 | Chey et al. ..................... 360/59 |
| 2003/0172520 A1 * | 9/2003 | Liu et al. .................. 29/603.03 |
| 2005/0270694 A1 * | 12/2005 | Umehara et al. ............. 360/126 |

FOREIGN PATENT DOCUMENTS

JP    2003-006990    1/2003

* cited by examiner

*Primary Examiner*—Hoa T. Nguyen
*Assistant Examiner*—James L Habermehl
(74) *Attorney, Agent, or Firm*—Townsend and Townsend and Crew LLP; Patrick Duncan (57) ABSTRACT

Embodiments in accordance with the present invention allow a magnetic disk drive to achieve noise reduction and low power consumption through rotation at a low speed and a high transfer rate through rotation at a high speed while allowing reliability to be maintained and achieving an improved recording density. An embodiment of a magnetic disk drive in accordance with the present invention includes, a magnetic disk medium driven at a plurality of rotational speeds, a magnetic head for recording and reproducing data in and from the magnetic disk medium, a heater for controlling a flying height of the magnetic head, and a control unit for controlling the current to the heater, and in that the control unit controls the current to the heater. The control unit controls the current to the heater according to the plurality of rotational speeds.

11 Claims, 5 Drawing Sheets

K: INNER CIRCUMFERENCE
L: INTERMEDIATE CIRCUMFERENCE
M: OUTER CIRCUMFERENCE

Fig.7

K: INNER CIRCUMFERENCE
L: INTERMEDIATE CIRCUMFERENCE
M: OUTER CIRCUMFERENCE

DISK DRIVE THAT CONTROLS HEATER CURRENT ACCORDING TO ROTATIONAL SPEED

CROSS-REFERENCE TO RELATED APPLICATION

The instant nonprovisional patent application claims priority to Japanese Patent Application 2006-039165, filed Feb. 16, 2006 and incorporated by reference in its entirety herein for all purposes.

BACKGROUND OF THE INVENTION

Disk drives are widely used not only in computer apparatus but also in home electrical appliances such as hard disk recorders. A disk drive has a recording medium and a head. The head flies above the recording medium to record or reproduce data in or from the same data by magnetizing the recording medium or reading the state of magnetization of the recording medium.

Recently, there is increasing demand for variable-speed disk drives capable of switching disk operating conditions between a plurality of rotating speeds (for example, see JP-A-2003-006990 (Patent Document 1). For example, in the field of disk drives used for recording and reproducing movies or images associated with news, there is a need for rotating a recording medium at a high speed to complete transfer in a short time when data are transferred from a server at a shop or home to a portable reproduction apparatus. There is also a need for rotating a recording medium at a low speed to suppress power consumption and noises when images are actually reproduced and watched in a mobile environment in which not so high data processing speed is required. In the case of disk drives for portable video cameras, for example, there is a need for rotating a recording medium at a low speed to suppress power consumption and noises during recording in a mobile environment and for rotating a recording medium at a high speed to complete transfer in a short time in transferring data to a stationary recorder or computer.

A magnetic disk drive operated at a plurality of rotating speeds has serious problems such as troubles in data recording and reproduction especially when one of the plurality of rotating speeds is much different another, e.g., twice or three times the other.

When data are written, the expanse of a magnetic field formed by the magnetic head can be made smaller, the smaller the gap between the recording medium and the magnetic head. The magnetized area of the recording medium can be thus kept small. That is, in order to increase the recording density of a magnetic disk drive, the gap between the recording medium and the magnetic head or the flying height of the magnetic head must be small. However, since a magnetic head is floated above a recording medium by an air pressure generated at an air bearing of a magnetic head slider, the flying height varies depending on the speed at which air flows into the gap between the magnetic head slider and the recording medium or the rotating speed of the recording medium. In general, the flying height of a magnetic head is greater at a higher rotating speed and smaller at a lower rotating speed. Therefore, when the air bearing is designed to prevent any contact in the flying at the lower rotating speed, problems can occur during recording or reproduction of data when the head flies at a great height at a high rotating speed because the gap between the recording medium and the magnetic head becomes to large. When elaboration is made to generate not only a positive pressure but also a negative pressure at the air bearing, the influence of the relative speed between the recording medium and the magnetic head on the flying height can be eliminated to some degree. However, when a difference between rotating speeds is as great as two or three-fold, there will be a speed difference of five-fold or more between the outer circumference of a disk rotating at the higher speed and the inner circumference of the same rotating at the lower speed. Resultant changes in the flying height can cause serious problems such as troubles in recording or reproduction of data.

BRIEF SUMMARY OF THE INVENTION

Embodiments in accordance with the present invention allow a magnetic disk drive to achieve noise reduction and low power consumption through rotation at a low speed and a high transfer rate through rotation at a high speed while allowing reliability to be maintained and achieving an improved recording density.

Figure 1:
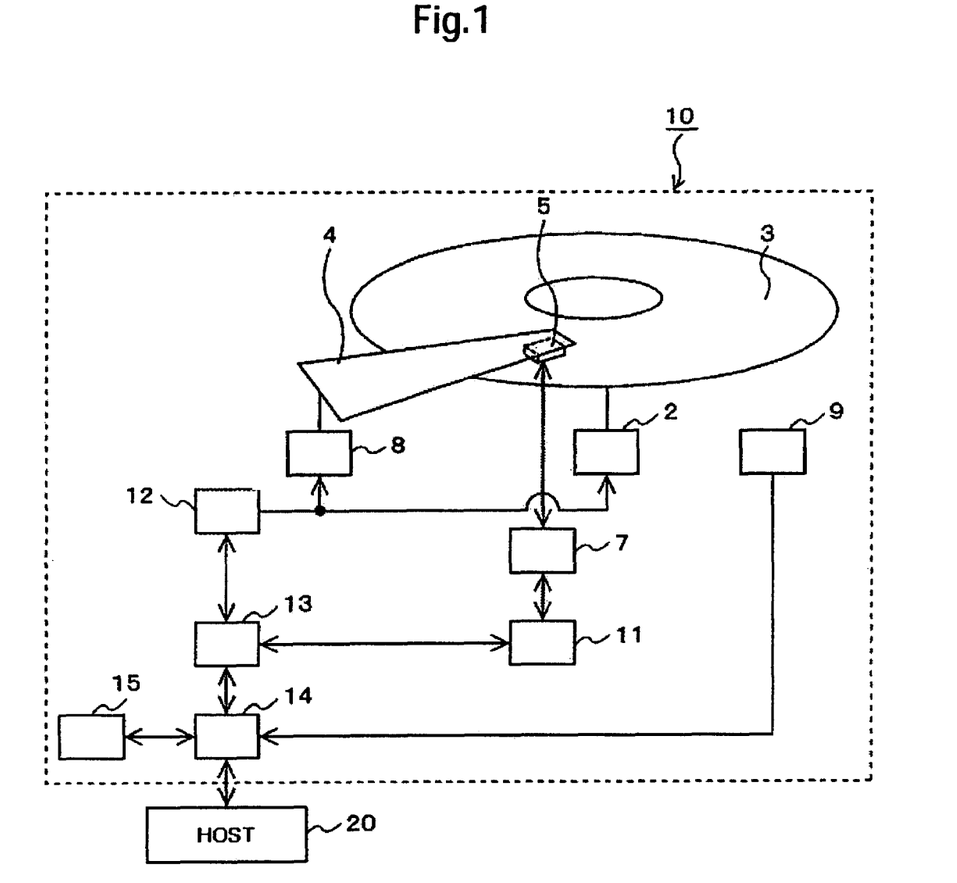
FIG. 1 is an exemplary block diagram showing a general configuration of a magnetic disk drive according to an embodiment of the present invention.

Referring to the embodiment of the present invention illustrated in FIG. 1, a magnetic disk drive 10 includes, a magnetic disk medium 3 driven at a plurality of rotational speeds, a magnetic head 5 for recording and reproducing data in and from the magnetic disk medium 3, a heater for controlling a flying height of the magnetic head 5, and a control unit 14 for controlling the current to the heater, and in that the control unit controls the current to the heater. The control unit 10 controls the current to the heater according to the plurality of rotational speeds.

For a more complete understanding o f the present invention, reference is made to the following detailed description taken in conjunction with the accompanying drawings.

DETAILED DESCRIPTION OF THE INVENTION

Embodiments in accordance with the present invention relate to a disk drive and, more particularly, relate to a disk drive capable of switching disk operating conditions between a plurality of rotating speeds.

Embodiments in accordance with the present invention provide a disk drive which may be kept reliable and improved in terms of recording density while achieving noise reduction and low power consumption through rotation at a low speed and allowing transfer at a high rate through rotation at a high speed.

A disk drive in accordance with an embodiment of the present invention comprises a recording medium driven at a plurality of speeds, a head for recording and reproducing data in and from the recording medium, a heater for controlling a flying height of the head, and a control unit for controlling the energization of the heater according to the rotational speeds.

examples of configurations of embodiments of the present invention are as Follows.

(1) The control unit controls the amount of current to the heater at a high rotational speed of the recording medium becomes greater than the amount of current to the heater at a low rotational speed of the recording medium.

(2) The control unit controls such that the current to the heater is stopped when the recording medium is rotating at a low speed and such that the heater is energized when the recording medium is rotating at a high speed.

(3) The control unit controls such that the amount of current to the heater during data recording becomes smaller than the amount of current to the heater during data reproduction and such that the difference between the heater energization amount during data reproduction and the heater energization amount during data recording becomes greater when the recording medium is rotating at a high speed than when the recording medium is rotating at a low speed.

(4) The control unit controls such that the amount of current to the heater during data recording becomes smaller than the amount of current to the heater during data reproduction and such that the difference between the heater energization amount during data reproduction and the heater energization amount during data recording becomes greater at a high recording frequency than at a low recording frequency.

(5) The control unit controls such that the amount of current to the heater is set based on at least any one of a cylinder number, the individuality of the magnetic head, and the distinction between recording and reproduction and such that the heater energization amount is in accordance with the temperature at the time of operation of the apparatus in that the heater energization amount is greater when the temperature at the time of operation of the apparatus is low than when the temperature at the time of operation of the apparatus is high.

(6) A group of control parameters determining the amount of current to the heater is stored in a non-volatile memory or on the disk medium in the disk drive.

(7) The group of control parameters determining the amount of current to the heater is stored in the non-volatile memory or on the disk medium by measuring a relationship between the disk rotational speed and the magnetic head flying height or between the disk rotational speed and the recording frequency or a relationship between the recording frequency and a reduction in the magnetic head flying height attributable to heat generated by a recording current during the manufacturing test of each individual drive.

(8) The control unit controls the amount of current to the heater based on a threshold for recording/reproduction performance of the drive.

Embodiments in accordance with the present invention may provide a disk drive which keeps reliable and improved in terms of recording density while achieving noise reduction and low power consumption by rotating a disk at a low speed and allowing data transfer at a high rate by rotating the disk at a high speed.

A plurality of embodiments of the present invention will now be described with reference to the drawings. Like reference numerals used in the embodiments indicate identical or equivalent elements.

First Embodiment

A magnetic disk drive of a first embodiment of the invention will be described with reference to FIGS. 1 to 7.

First, an overview of the magnetic disk drive of the present embodiment will be given with reference to FIGS. 1 to 3.

As shown in FIG. 1, a magnetic disk drive 10 is configured to include a spindle motor 2, a magnetic disk medium (recording medium) 3, a carriage assembly 4, a magnetic head 5, a pre-amplifier 7, a voice coil motor 8, a temperature sensor 9, a read/write channel 11, a motor driver 12, a hard disk controller (HDC) 13, a control unit 14, and a memory unit 15. The magnetic disk drive 10 is a variable-speed type magnetic disk drive capable of switching disk operating conditions between a plurality of rotational speeds, and the drive may be used not only in computer apparatus but also in home electric appliances such as hard disk recorders.

The spindle motor 2 drives the disk-shaped magnetic disk medium 3 for rotation. The magnetic disk medium 3 is driven at a plurality of rotational speeds. The carriage assembly 4 is driven for rotation by the voice coil motor 8, whereby the assembly causes the magnetic head 5 attached to an end thereof to move above and relative to the magnetic disk medium 3 substantially in the radial direction thereof.

Figure 2:
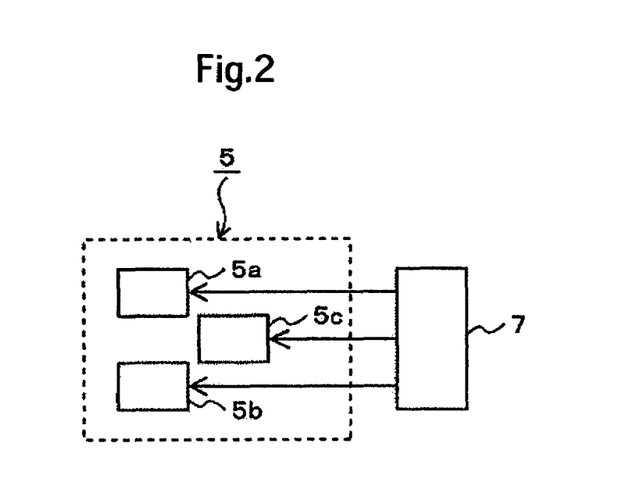
FIG. 2 is an exemplary block diagram showing a configuration of a magnetic head of the magnetic disk drive according to an embodiment of the present invention.
Figure 3:
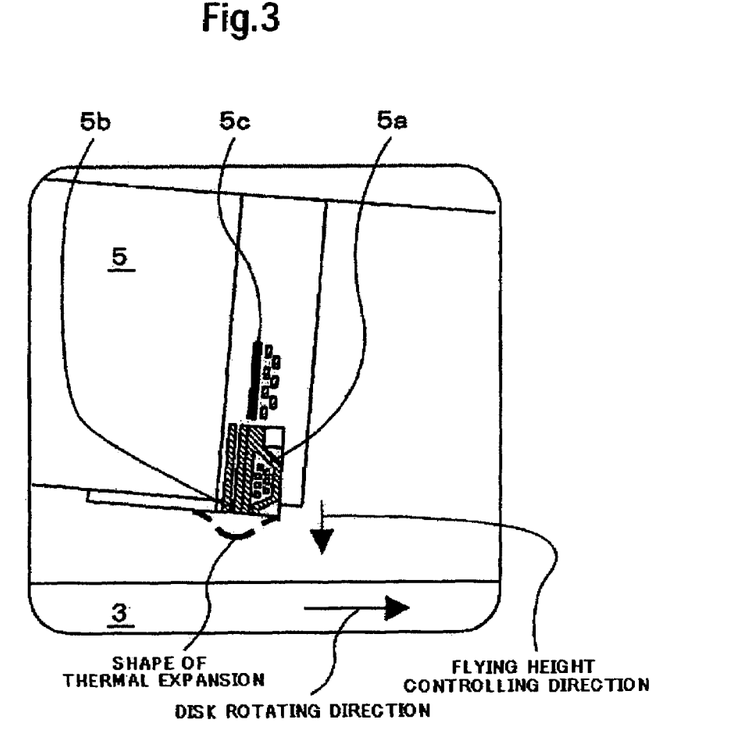
FIG. 3 is an exemplary sectional view of the magnetic head for explaining the concept of control over a flying height of the magnetic disk drive according to an embodiment of the present invention.

As shown in FIGS. 2 and 3, the magnetic head 5 includes a recording element 5a which flies above the magnetic disk medium 3 to magnetically record data on the magnetic disk medium 3 and a reproducing element 5b which reproduces data recorded on the medium. Further, the magnetic head 5 is provided with a heater 5c constituted by a thin film resistor. The heater 5c is provided to adjust the flying height of the recording element 5a and the reproducing element 5b through a thermal expansion thereof and is disposed in the vicinity of the recording element 5a and the reproducing element 5b.

The pre-amplifier 7 receives the input of a signal representing data to be recorded and amplifies the signal which is then output to the recording element 5a of the magnetic head 5. The pre-amplifier 7 also provides an amplified output of a reproducing signal output by the reproducing element 5b. Further, the pre-amplifier 7 receives the input of a specification of the amount of energization (electric energy) to be output to the heater 5c and supplies a current to the heater 5c to achieve the specified amount of energization. Alternatively, a voltage supplied to the heater 5c may be varied to achieve the specified amount of energization.

The temperature sensor 9 detects the ambient temperature in the neighborhood of the magnetic head 5 and outputs a signal indicating the detected temperature. For example, the temperature sensor 9 may be disposed on the carriage assembly. Alternatively, the sensor may be disposed on a substrate (card) along with the HDC 13 and the control unit 14. Thus, the temperature sensor 9 may detect the temperature at the time of operation of the apparatus.

The read/write channel 11 outputs a signal, which is a code obtained by modulating data to be recorded, to the pre-amplifier 7. The read/write channel 11 also demodulates a reproduction signal output by the pre-amplifier 7 into a code and outputs the demodulated data to the HDC 13.

The motor driver 12 outputs a drive current to the spindle motor 2 and the voice coil motor 8 according to an instruction input from the control unit 14 to operate the spindle motor 2 and the voice coil motor 8. The HDC 13 receives data to be recorded and commands transferred from an external host 20 and transfers reproduction data output from the read/write channel 11.

The control unit 14 exercises control over each part of the apparatus, e.g., control over the motor driver 12 to control the position of the magnetic head 5. The control unit 14 is a program-controlled device such as a microcomputer which is operated according to a program incorporated therein and/or a program stored in the memory unit 15. In the present embodiment, the control unit 14 instructs switching between a plurality of rotational speeds of the spindle motor 2 and instructs the pre-amplifier 7 on the amount of current to be supplied to the heater 5c.

A program to be executed by the control unit 14 and data required for the execution of the program are stored in the memory unit 15. Further, values referred to by the control unit 14 in controlling the heater 5c (control parameters) are stored in the memory unit 15. The memory unit 15 includes a non-volatile memory such as an EEPROM (electrically erasable ROM). Further, the memory unit 15 may include some regions on the magnetic disk medium 3. In such a case, control parameters are stored on the magnetic disk medium 3 at the time of manufacture. When the parameter are used, they are first copied from the magnetic disk medium 3 onto a memory after supplying electric power, and reference is made to them when the heater 5c is controlled. High speed access is realized by controlling the heater 5c using control parameters copied onto a memory as thus described.

A description will now be made on a heater energization amount calibration procedure included in steps for manufacturing the magnetic disk drive 10. In the present embodiment, after the assembly of each part of the magnetic disk drive 10 and the recording of a servo signal in the magnetic disk medium 3 is completed, various individual characteristics of the magnetic head 5 is tested first. Second, amounts of current to the heater 5c of the head are secondly determined based on the results of the test. Third, control parameters associated with the amounts of energization are thirdly stored in the memory unit 15.

The setting of amounts of current to the heater 5c described above is made according to any one of a plurality of rotational speeds, temperatures at the time of operation of the apparatus, cylinder numbers (radial positions of the magnetic disk medium 3), the individuality of the magnetic head 5, and the distinction between recording and reproduction. The setting may alternatively be made according to a combination of those factors (including a combination of all of them). The control unit 14 controls the amount of current to the heater 5c according to the setting.

For example, the various individual characteristics of the head mentioned above include the following. The first characteristic is recording and reproducing performance of each magnetic head 5 such as an error rate and overwrite performance. The second is a difference dFH (see, e.g., FIG. 5) between flying heights of the magnetic head 5 during recording and reproduction. The third is a change in the flying amount per unit power FP of each heater 5c, i.e., the efficiency of the heater. The fourth is a change in the flying amount per unit temperature change FT, i.e., the influence of the ambient temperature on the flying height of the magnetic head 5. The fifth is a change in the flying amount of the magnetic head 5 as a result of a change in the rotational speed. The sixth is the individual flying height of each magnetic head 5 under certain reference conditions.

The first test or the test of the recording and reproducing performance of the magnetic head 5 is conducted as follows. A tester on a production line is connected to the magnetic disk drive 10, and data to be recorded and a record command are output from the tester to the magnetic disk drive 10. Then, a reproduction command is output from the tester to the magnetic disk drive 10. Thus, data recording and reproduction is performed on a magnetic disk medium 3 using the magnetic head 5, and an error rate is detected at the tester. A threshold for error rates is set in advance, and it is checked whether the magnetic head 5 has cleared the threshold under the reference conditions. Otherwise, the degree of the shortage from the threshold is checked. Although the test is conducted only in an environment at room temperature in general, flying height control may be performed with higher accuracy if the test is conducted in a plurality of temperature ranges. It is more desirable to conduct the test in each of a plurality of zones of the disk divided in the radial direction thereof than conducting it in only one location. It is also desirable to conduct the test at a plurality of the disk rotational speeds than conducting it at only any one of the rotational speeds.

Although it is most desirable to conduct the first test on all magnetic disk drives 10 when they are manufactured, an average value obtained in advance through a test on samples in a sufficient quantity may be adopted to omit the testing at the time of manufacture, which still allows the advantage of the present embodiment to be achieved to a limited degree. This holds true for the second to sixth tests described below.

The second test or the test on a difference between flying heights (dFH) of the magnetic head 5 during data recording and reproduction may be conducted as follows. For example, a certain sector of a certain cylinder may be checked to compare amplitudes of a reproduction signal of data recorded in the sector in advance, i.e., an amplitude in a state in which several hundred sectors preceding the sector have been continuously recorded (a state in which heat is imparted by a recording current immediately after continuous recording) and an amplitude in a state in which none of the several hundred sectors preceding the sector has been recorded (a state in which heat has not been imparted by a recording current). Then, the result may be converted using the Wallace's equation of spacing loss to obtain a measurement of the flying height difference dFH.

Figure 4:
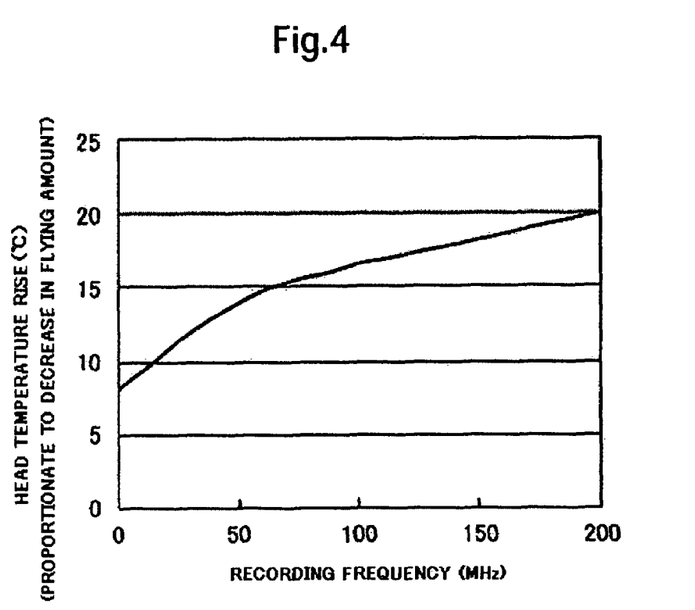
FIG. 4 is an exemplary graph showing a relationship between head flying heights and recording frequencies in the magnetic disk drive according to an embodiment of the present invention.

Heating by a recording current results in iron loss and copper loss. Copper loss is not dependent on the recording frequency, whereas iron significantly depends on the recording frequency. Therefore, the recording/reproduction flying height difference dFH as a whole depends on the recording/reproducing frequency. FIG. 4 shows a relationship between them. In the case of a magnetic disk drive operated at a plurality of disk rotational speeds, the recording/reproduction flying height difference dFH depends on the disk rotational speeds in consequence because the recording frequency varies with the rotational speed even in the same radial position. Therefore, the recording/reproduction flying height difference dFH must be measured under the plurality of disk rotational speed conditions to determine a proper amount of current to the head for each of the rotational speeds. When the recording current is varied depending on the radial position and temperature, the recording/reproduction flying height difference dFH must be measured under each condition.

Referring to the third test or the test on heater efficiency (FP), the amplitude of a reproduction signal of data recorded in advance in a certain sector is measured with the heater power varied, and the result may be converted using the Wallace's equation of spacing loss into a change in the flying amount which is to be measured.

Referring to the fourth test or the test on a change in the flying amount per unit temperature change (FT), the amplitude of a reproduction signal of data recorded in advance in a certain sector is measured with the ambient temperature varied, and the result may be converted using the Wallace's equation of spacing loss into a change in the flying amount which is to be measured. The sample testing may be performed by in other ways of testing utilizing optical interference instead of causing the magnetic head to fly and move above a magnetic disk medium.

Referring to the fifth test or the test on a change in the flying amount as a result of a change in rotational speed, measurements may be obtained by conducting a test of individual flying heights to be described later at different rotational speeds. Sample testing may be a flight test utilizing optical interference on a transparent disk. A change in the flying amount as a result of a change in rotational speed may be accurately identified through a simulation on a computer using the thin gas film lubrication theory.

Referring to the sixth test or the test on individual flying heights, the power applied to the heater 5c is gradually increased, and any contact between the magnetic head 5 and the magnetic disk medium 3 is detected from, for example, a disturbance in a servo signal. The initial flying height is calculated from the data of power at the contacting limit and heater efficiency obtained by the third test.

Amounts of current to the heater 5c of the magnetic head 5 are determined based on results of the tests on various characteristics described above, and control parameters associated with the energization amounts are stored in the memory unit 15. This process is conceptually described with reference to FIG. 5.

Figure 5:
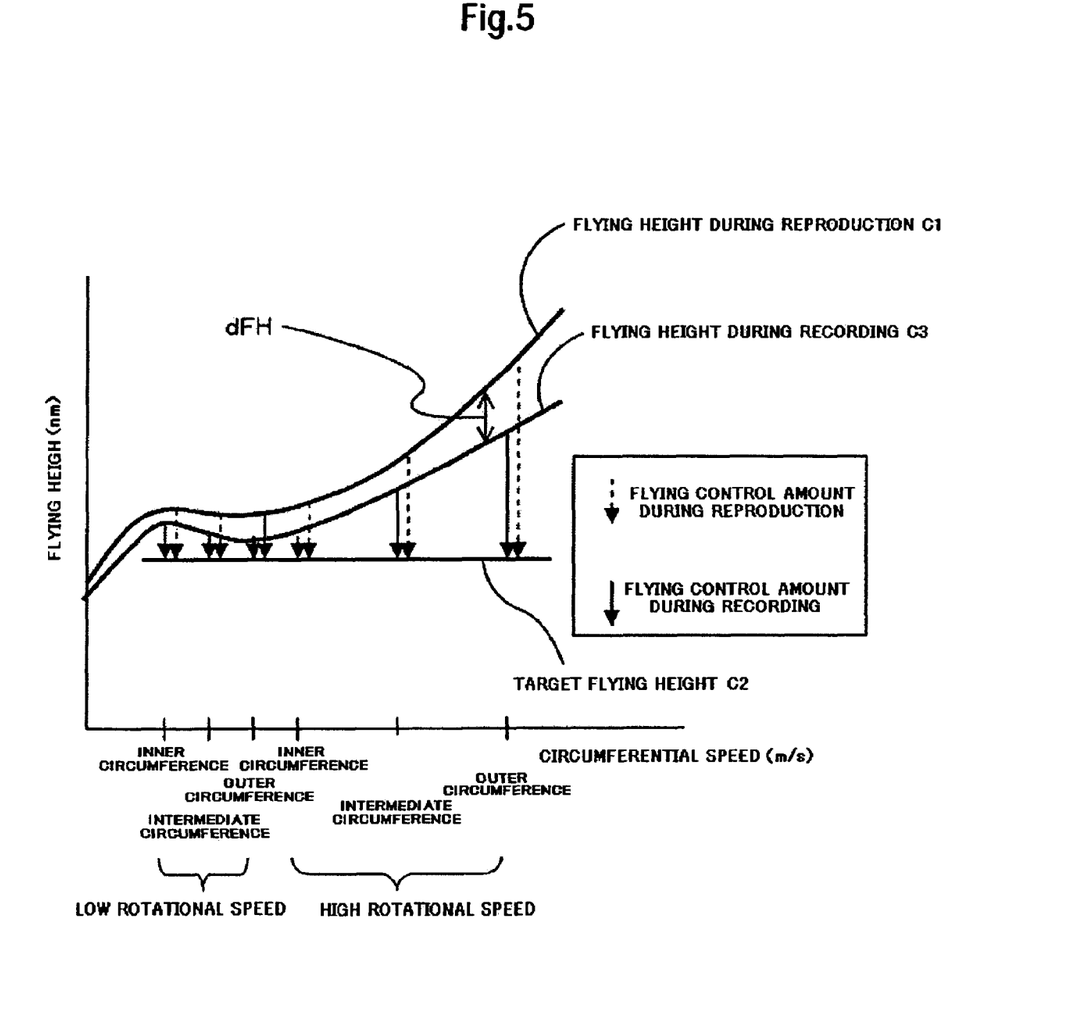
FIG. 5 is an exemplary conceptual diagram showing a method of controlling the flying height of the magnetic disk drive according to an embodiment of the present invention.

Although FIG. 5 shows three regions, i.e., inner circumferential, intermediate, and outer circumferential regions as radial positions of a disk, the number of divisions to define radial positions is not limited to three, and a greater number of divisions may be provided. The curve C1 in FIG. 5 is a graphical representation of "changes in the flying amount as a result of changes in the rotational speed" obtained by the fifth test described above. In general, the flying amount is greater at a higher rotational speed and smaller at a lower rotational speed. Therefore, when the air bearing is designed prevent any contact between the magnetic disk medium 3 and the magnetic head 5 at a low rotational speed, the gap between those elements becomes too great at a higher rotational speed to cause troubles in data recording and reproduction. Under the circumstance, in the present embodiment, the heater 5c is energized at the time of reproduction to decrease the flying height as indicated by the arrows in broken lines in FIG. 5, thereby achieving a flying amount that is as constant as possible as indicated by a straight line C2 representing a target flying height. Power PR to be applied at each rotational speed and at each radial position is obtained by dividing the flying height adjusting amount indicated by the arrow in a broken line by the heater efficiency FP of the head (the result of the third test).

During recording, "the recording/reproduction flying height difference dFH" obtained by the second test must be considered. As a result, flying heights are represented by the curve C3 in FIG. 5. Power PW to be applied at each rotational speed and at each radial position is obtained by dividing the flying height adjusting amount indicated by the arrow in a solid line in the figure minus the recording/reproduction flying height difference dFH by the heater efficiency FP of the head (the result of the third test).

According to some embodiments of the present invention, a correction is made depending on the temperature range of use in consideration to "the change in the flying amount per unit temperature change" obtained by the fourth test. Then, a substantially uniform flying height may be achieved in any temperature range, which allows data recording and reproduction to be performed with reduced troubles.

Figure 6:
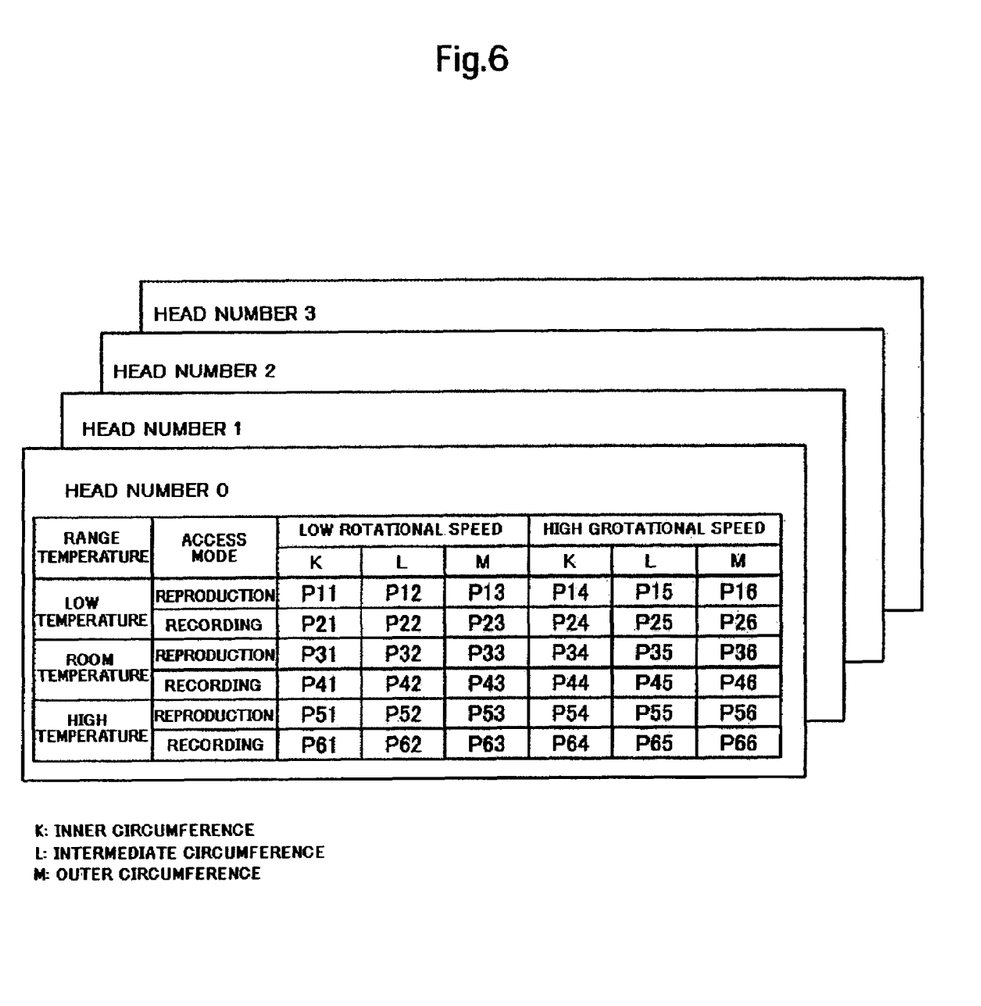
FIG. 6 is an exemplary conceptual illustration showing details of control parameters stored in a memory unit of the magnetic disk drive according to an embodiment of the present invention.

The power PR to be applied during reproduction and the power PW to be applied during recording in the present embodiment described above may be converted into control parameters as shown in FIG. 6. The control parameters are parameters determining the magnitude of power, voltage, or current supplied to the heater 5c. In the present embodiment, there is correspondence between the values of power to heat the heater 5c and control parameters, for example, a parameter "0" corresponding to power of 0 mW, a parameter "1" corresponding to power of 2 mW, a parameter "10" corresponding to power of 20 mW. In the present embodiment, a control parameter is determined for each head, each zone, each temperature range, and each access mode (recording or reproduction) and is stored in the region of the non-volatile memory of the memory unit 15 or in a particular region on the magnetic disk medium 3. That is, the memory unit 15 has a table of control parameters as shown in FIG. 6. The access mode "reproduction" may imply not only the time of data reproduction but also a period of time immediately preceding the start of recording.

Since a flying height controlling amount provided by the heater is substantially proportionate to the power, the degree of heating of the heater is first calculated from the power. When the pre-amplifier 7 employs current control, a current I is converted as $I=\sqrt{(P/RH)}$ using resistance RH of the heater 5c (heater resistance) obtained through measurement at a sampling inspection of magnetic disk drives 10 being manufactured, and a control parameter associated with the current is stored. When the pre-amplifier 7 employs voltage control, a voltage is obtained as the square root of a value obtained by multiplying the power by the resistance of the heater 5c, and a control parameter associated with the voltage is stored.

Although FIG. 6 shows three types of temperature ranges, i.e., low temperatures, room temperature, and high temperatures, more accurate control may be exercised by providing smaller divisions instead of the three types or performing linear interpolation between them. The three types of radial positions, i.e., the inner, intermediate, and outer circumferential positions are not shown in a limiting sense, and more accurate control may be exercised by providing smaller divisions or performing linear interpolation between them.

Figure 7:
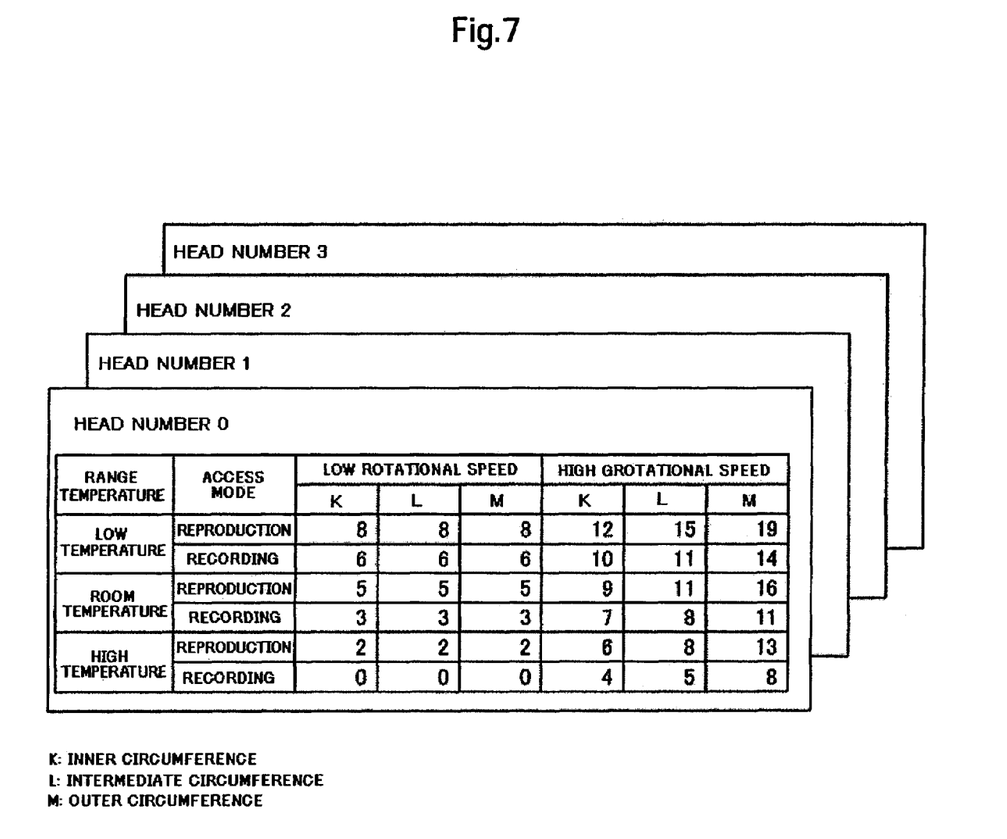
FIG. 7 is an exemplary conceptual illustration showing examples of the control parameters stored in the memory unit of the magnetic disk drive according to an embodiment of the present invention.

FIG. 7 shows examples of specific values of control parameters. Although the values in FIG. 7 are merely examples, the concept of the invention is indicated by the fact that values under high temperature conditions, under low rotational speed conditions, and at the time of recording are smaller than values under low temperature conditions, under high rotational speed conditions, and at the time of reproduction, respectively. The concept of the invention is also indicated by the fact that differences between values at the time of reproduction and the time of recording become greater under high speed rotational conditions than low speed rotational conditions.

The control unit 14 may be controlled such that it stops energizing the heater 5c when the rotational speed of the magnetic disk medium 3 is low and energizes the heater 5c when the rotational speed of the magnetic disk medium 3 is high. As a result, power consumption may be suppressed when the rotational speed of the magnetic disk medium 3 is low, and the gap between the magnetic disk medium 3 and the magnetic head 5 may be kept small even when the rotational speed of the magnetic disk medium 3 is high. When the rotational speed of the magnetic disk medium 3 has three or more steps, the current to the heater 5c may be stopped at the lowest rotational speed, and the amount of current to the heater 5c may be controlled when the magnetic disk medium 3 is at the plurality of higher rotational speeds.

The magnetic disk drive 10 of the present embodiment described above includes the magnetic disk medium 3 driven at a plurality of rotational speeds, the magnetic head 5 for recording and reproducing data in and from the magnetic disk medium 3, the heater 5 for controlling the flying height of the magnetic head 5, and the control unit 14 for controlling the current to the heater 5, and the current to the heater 5 is controlled by the control unit 10 according to the plurality of rotational speeds. It is therefore possible to achieve noise reduction and low power consumption through rotation at a low speed and to achieve a high transfer rate through rotation at a high speed. It is also possible to maintain reliability and to achieve an improved recording density.

The magnetic disk drive 10 of the present embodiment may be provided with a great capacity or small size through an increase in the recording density that is achieved, for example, by keeping the gap between the magnetic disk medium 3 and the magnetic head 5 as small as possible even under the plurality of rotational speed conditions. It is also possible to achieve noise reduction and low power consumption as occasion demands and to achieve a high transfer rate when demanded in other occasions.

Second Embodiment

A second embodiment of the invention will now be described. The second embodiment is different from the first embodiment in the aspect described below and is basically the same as the first embodiment in other aspects which will therefore be omitted in the following description to avoid duplication.

In the above-described first embodiment, the flying height is controlled to a constant and smallest possible value within a range in which no contact with the magnetic disk medium 3 occurs even if there is variation of conditions such as the rotational speed. On the contrary, in the second embodiment, when the sixth and fifth tests are conducted or when individual flying heights and changes in the flying amount as a result of changes in the rotational speed are checked, a point is found at which recording and reproduction performance is satisfied a certain threshold at the first test, and the heater 5c is controlled based on the finding.

In the second embodiment, initial recording and reproduction performance (such as an error rate and overwrite performance) is measured on different magnetic heads 5 or at different rotational speeds with no power supplied to the heater 5c. When the threshold is satisfied at the first measurement, the process is terminated and, if not, the heater power is gradually increased to find power at which satisfactory recording and reproducing performance is achieved. Although the power thus identified does not necessarily result in a constant flying height, the resultant power may be used as a reference for controlling the heater 5c without any problem because the ultimate goal is to achieve the recording and reproduction performance.

When contact is detected before the threshold is reached, it is judged that the head has not inherently had the required performance, and the relevant magnetic disk drive is reassembled with the head replaced.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A disk drive comprising:
    a recording medium driven at a plurality of rotational speeds;
    a head for recording and reproducing data in and from the recording medium;
    a heater for controlling a flying height of the head; and
    a control unit for controlling the current to the heater according to the rotational speeds.

2. A disk drive according to claim 1, wherein the control unit controls the amount of current to the heater at a high rotating speed of the recording medium becomes greater than the amount of current to the heater at a low rotating speed of the recording medium.

3. A disk drive according to claim 2, wherein the control unit controls such that the amount of current to the heater during data recording becomes smaller than the amount of current to the heater during data reproduction, and controls such that the difference between the current amount during data reproduction and the current amount during data recording becomes greater when the recording medium is rotating at a high speed than when the recording medium is rotating at a low speed.

4. A disk drive according to claim 2, wherein the control unit controls such that the amount of current to the heater during data recording becomes smaller than the amount of current to the heater during data reproduction, and controls such that the difference between the current amount during data reproduction and the current amount during data recording becomes greater at a high recording frequency than at a low recording frequency.

5. A disk drive according to claim 2, wherein the control unit sets the amount of current to the heater based on at least any one of a cylinder number, the individuality of the head, and the distinction between recording and reproduction, and controls the current amount which is greater when the temperature at the time of operation of the apparatus is low than when the temperature at the time of operation of the apparatus is high.

6. A disk drive according to claim 2, wherein a group of control parameters determining the amount of current to the heater is stored in a non-volatile memory or in the recording medium in the disk drive.

7. A disk drive according to claim 1, wherein the control unit stops the current to the heater when the recording medium rotates at a low speed, and turn on the current to the heater when the recording medium rotates at a high speed.

8. A disk drive according to claim 1, wherein the control unit sets the amount of current to the heater based on at least any one of a cylinder number, the individuality of the head, and the distinction between recording and reproduction, and controls the current amount which is greater when the temperature at the time of operation of the apparatus is low than when the temperature at the time of operation of the apparatus is high.

9. A disk drive according to claim 1, wherein a group of control parameters determining the amount of current to the heater is stored in a non-volatile memory or in the recording medium in the disk drive.

10. A disk drive according to claim 9, characterized in that the group of control parameters determining the amount of energization of the heater is stored in the memory unit by measuring a relationship between the disk rotating speed and the head flying height or between the disk rotating speed and the recording frequency or a relationship between the recording frequency and a reduction in the head flying height attributable to heat generated by a recording current during the manufacturing test of each individual drive.

11. A disk drive according to claim 1, characterized in that the control unit controls the amount of energization of the heater based on a threshold for recording/reproduction performance of the drive.

* * * * *